(12) United States Patent  
Chiriatti

(10) Patent No.: US 11,050,297 B2  
(45) Date of Patent: Jun. 29, 2021

(54) LAUNDRY TREATING APPARATUS

(71) Applicant: Electrolux Appliances Aktiebolag, Stockholm (SE)

(72) Inventor: Antonio Francesco Chiriatti, Schorndorf (DE)

(73) Assignee: Electrolux Appliances Aktiebolag

( * ) Notice: Subject to any disclaimer, the term of this patent is extended or adjusted under 35 U.S.C. 154(b) by 0 days.

(21) Appl. No.: 16/462,372

(22) PCT Filed: Nov. 20, 2017

(86) PCT No.: PCT/EP2017/079819  
§ 371 (c)(1),  
(2) Date: May 20, 2019

(87) PCT Pub. No.: WO2018/091717  
PCT Pub. Date: May 24, 2018

(65) Prior Publication Data  
US 2019/0319489 A1    Oct. 17, 2019

(30) Foreign Application Priority Data

Nov. 21, 2016  (IT) .................. 10 2016 000109799

(51) Int. Cl.  
*H02J 50/10* (2016.01)  
*D06F 37/06* (2006.01)  
*D06F 39/04* (2006.01)  
*H01F 27/28* (2006.01)  
*D06F 25/00* (2006.01)

(52) U.S. Cl.  
CPC ............ *H02J 50/10* (2016.02); *D06F 37/065* (2013.01); *D06F 39/045* (2013.01); *H01F 27/288* (2013.01); *D06F 25/00* (2013.01)

(58) Field of Classification Search  
CPC ........ H02J 50/10; H01F 27/288; D06F 25/00; D06F 37/065; D06F 39/045  
USPC ......................................................... 307/104  
See application file for complete search history.

(56) References Cited

U.S. PATENT DOCUMENTS

| | | | |
|---|---|---|---|
| 3,878,721 A * | 4/1975 | Nath ...................... | G01K 13/08 374/154 |
| 9,951,465 B1 * | 4/2018 | Herschler ............... | D06F 58/30 |
| 2014/0355247 A1 * | 12/2014 | Ius ......................... | H02J 50/10 362/89 |
| 2014/0366589 A1 * | 12/2014 | Park ....................... | D06F 37/22 68/140 |
| 2016/0330572 A1 * | 11/2016 | Kropp .................... | D06F 33/00 |

FOREIGN PATENT DOCUMENTS

| | | |
|---|---|---|
| EP | 2302125 A1 | 3/2011 |
| JP | 2005177331 A | 7/2005 |

OTHER PUBLICATIONS

International Search Report and Written Opinion for International Application No. PCT/EP2017/079819, dated Feb. 23, 2018—9 pages.

* cited by examiner

*Primary Examiner* — Alfonso Perez Borroto  
(74) *Attorney, Agent, or Firm* — RatnerPrestia

(57) ABSTRACT

A laundry treating apparatus having a tub, a drum rotatably mounted inside the tub, at least one electrical powered element mounted in the drum, a wireless power transmitter unit and a wireless power receiver unit. The wireless power receiver unit supplies power to the electrical powered element.

20 Claims, 5 Drawing Sheets

LAUNDRY TREATING APPARATUS

This application is a U.S. National Phase application of PCT International Application No. PCT/EP2017/079819, filed Nov. 20, 2017, which claims the benefit of Italian Application No. 10 2016 000109 799, filed Nov. 21, 2016, both of which are incorporated by reference herein.

The invention relates to a heating and control system for a washer or dryer appliance for heating water to be used in the washing cycle or clothes in the drying cycle.

Traditional water heating system use electrical resistance devices, which are installed in the sump area, created in the bottom side of the washer tub. This positioning has several drawbacks on the appliance performance and cost. First of all the risk of heater electrical insulation cracking during the life time, which could cause a safety risk. It requires a special electrical insulation and additional system safety functions that add costs to the appliance. In addition the sump volume must be filled with water and heated before it transfers the generated heat to the water and laundry in the drum. This means that the area close to the heating element will be the first to be heated and it will reach a higher temperature than the temperature needed in the drum to run the washing cycle, creating a loss of energy on the tub surface.

Moreover until the heat is transferred into the drum the action of the detergent is not activated, increasing the washing cycle duration.

JP 2005 177331 discloses a washing machine which includes induction heating means for electromagnetic Induction heating of the tub wall of the washing machine.

It is an object of the present invention to provide a laundry treating apparatus, which does not present the above problems and is provided with a very efficient heating system.

According to the invention there is provided a heating element in the washer or washer dryer drum supplied by an electromagnetic coupling between a power transmitter unit positioned on the tub side and a power receiver unit fixed on the drum side opposite to the power transmitter unit.

A first embodiment foresees three heating elements integrated in the lifters in the drum. A power transmitter unit fixed to the tub transfers the electric power through magnetic coupling to a power receiver unit fixed to the drum. Electric wires in the drum connect the power receiver unit to the heating elements. The appliance power control unit controls directly the power generated by the heating elements through the power, supplied to the power transmit unit.

In another embodiment there is provided an interface unit in the drum that provides wireless to the appliance control unit temperature measurement data.

In a further advantageous embodiment the interface unit supplies wireless, temperatures and other measured parameters to the appliance control unit.

The present invention thus relates to a laundry treating apparatus comprising a tub, a drum rotatably mounted inside the tub, at least one electric element mounted in the drum, a wireless power transmitter unit and a wireless power receiver unit, characterized in that the wireless power receiver unit supplies power to the at least one electric element.

The at least one electric element preferably comprises at least one heating element.

In addition or in alternative, the at least one electric element may comprise at least one interface unit designed to wirelessly transmit data. More in general, the at least one electric element may comprise a wireless transmission device.

In addition or in alternative, the electric element, may comprise at least one sensor element.

The apparatus, which advantageously comprises an appliance control unit, may have at least one sensor element fixed to the drum and designed to generated measurement data; in such case, the at least one interface unit is designed to wirelessly transmit said measurement data to the control unit.

Preferably, the power transmitter unit and the power receiver unit are positioned, one opposite to the other, fixed respectively to the tub and to the drum, parallel in radial direction.

In one preferred embodiment, the power transmitter unit comprises a transmission coil generating a magnetic field and the power receiver unit comprises a reception coil generating power from the magnetic field generated by the transmission coil and supplying the generated power to the at least one electric element.

The transmission coil and the reception coil are preferably aligned, centered and parallel in radial direction.

The transmission coil and the reception coil preferably have a common radius dimension approximately equal to the drum external radius and are distanced in axial direction by a distance lower (typically much lower) than their radius.

Such distance is preferably lower than 10 cm, more preferably lower than 5 cm.

In a possible embodiment, the power receiver unit comprises a reception coil and a receiver shielding member, and the transmitter unit comprises a transmission coil and a transmission shielding member.

Preferably, the receiver shielding member is positioned between the reception coil and the drum side, and the transmission shielding member is positioned between the transmission coil and the tub side.

The receiver magnetic shielding member is preferably positioned on the opposite side of the reception coil with respect to the power transmitter unit.

The transmission magnetic shielding member is preferably positioned on the opposite side of the transmission coil with respect to the power receiver unit.

In one possible embodiment, the power receiver unit comprises at least two reception coils and the at least one electric element comprises at least two electric elements, the at least two reception coils supplying the at least two electric elements.

Preferably, the drum comprises at least one drum lifter and in the at least one electric element is integrated in the at least one drum lifter.

Preferably, the drum comprises at least one drum lifter and in the at least one sensor element comprises at least one temperature sensing element positioned in the at least one drum lifter and designed to generate temperature measurement data.

The apparatus advantageously comprises an appliance control unit and the at least one electric element preferably comprises at least one interface unit designed to wirelessly transmit said temperature measurement data to the control unit.

The at least one interface unit is preferably fixed to the drum and the power receiver unit preferably comprises a reception coil supplying the at least one interface unit.

Advantageously, the at least one interface unit may be fixed to a central radial portion of the drum.

The interface unit is preferably configured to wirelessly transmit to the control unit also further measurement data received from at least another sensor element.

The drum advantageously comprises at least one drum lifter and the at least one sensor element preferably comprises at least one temperature sensing element positioned in the at least one drum lifter and designed to generate temperature measurement data.

The apparatus advantageously comprises an appliance control unit and the at least one electric element preferably comprises at least one interface unit designed to wirelessly transmit said temperature measurement data to the control unit.

Other advantages and features of a heating system for a laundry treating apparatus, according to the present invention will be clear from the following detailed description, provided only as a non limitative example, in which.

In the figures same parts are indicated with the same reference numbers.

Figure 1:
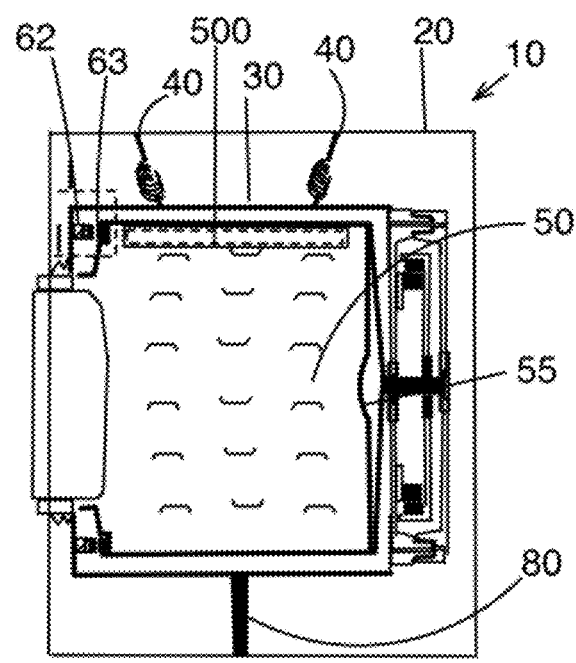
FIG. 1 is a sectional view of a first possible embodiment of a horizontal axis washer with a heating system according to this invention.

In FIG. 1 it is shown a sectional view of the key structural parts of a horizontal axis washer 10. In particular it is shown the wash unit consisting of the tub 30 on which is rotatably mounted a drum 50. The wash unit is suspended to the cabinet 20 through springs 40 and dumpers 80.

At the external front side, corresponding to the drum 50 opening side, of the drum 50 is fixed a power supply receiver unit 63.

The receiver power unit 63 is electromagnetically coupled to a power supply transmitter unit 62 fixed to the Tub 50.

They are annular shaped, centred with the drum centre and mounted radially parallel respectively on the Tub 30 and on the drum 50.

Figure 2:
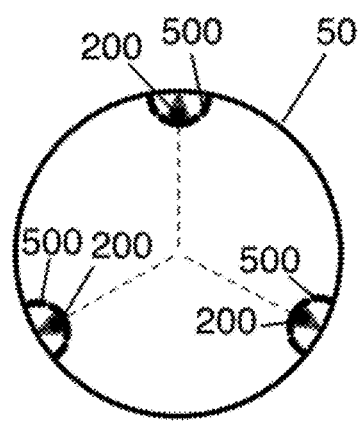
FIG. 2 is a sectional view of the drum with the lifters and heating elements.

The drum 50 has three drum lifters 500, disposed 120 degrees spaced, to lift the clothes in the washing cycle. In each lifter 500 is integrated a heating element. 200, as shown in FIG. 2 a sectional view of the drum 50 taken in radial direction.

Figure 3:
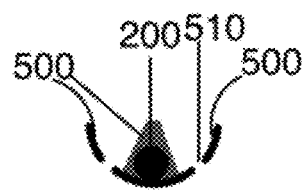
FIG. 3 is a detailed sectional view of the drum lifter and heating element.

The power receiver unit 63 through electric wires supplies the heating elements 200. In FIG. 3 is shown in detail the sectional, view of a lifter 500. The heating element 200 is integrated in the lifter 500, it could be cylindrical shaped having the same length as the lifter 500 in axial direction. The opening 510 in the lifter 500 can allow the water to get inside the lifter 500 facilitating the heat exchange between the heating element 200 and the water in the drum 50. Having assumed to have three heating elements 200 integrated in the three drum lifters the heat exchange surface between the heating elements and the mix of the water and clothes in the drum 50 is very high. It avoids high heat transfer concentration on a small surface and allows a faster efficient and safe heating process.

The power receiver unit 63 is fixed parallel in radial direction opposite the power transmitter unit 62.

Figure 4:
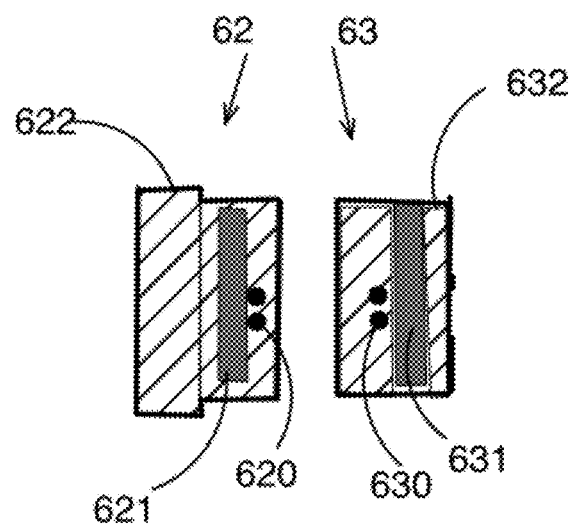
FIG. 4 is a sectional view of the transmitter power unit and receiver power unit.

In FIG. 4 is shown a sectional view of the power transmitter unit 62 and receiver unit 63.

The power transmitter unit 62 has a transmission coil 620 which is electromagnetically coupled to the reception coil 630 of the power receiver unit 63. They are integrated into the enclosing material 622, 632 and have respectively the magnetic sheets 621 and 631 that provide the side magnetic shield to the sides external to the coupling area and improve the magnetic coupling between the two coils 622 and 632.

Figure 5:
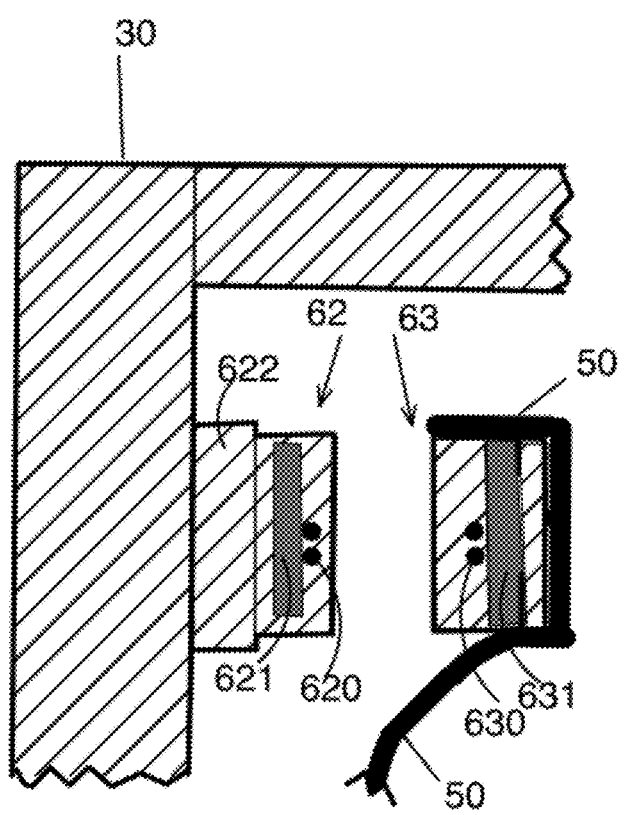
FIG. 5 is a sectional view taken along the surface I I indicated in FIG. 1 showing in detail the fixation of the power transmitter unit to the tub and power receiver unit to the drum.

They are parallel, centred with respect to the drum 50 centre in order to maximize the electromagnetic coupling, as shown in FIG. 5, a sectional view taken along the surface I-T indicated in FIG. 1. The power receiver unit 63 could be fixed in a U shaped opening formed in the drum 50 external periphery, while the power transmitter unit could have its side 622 fixed with screw or glued to the tub 30 wall.

Figure 6:
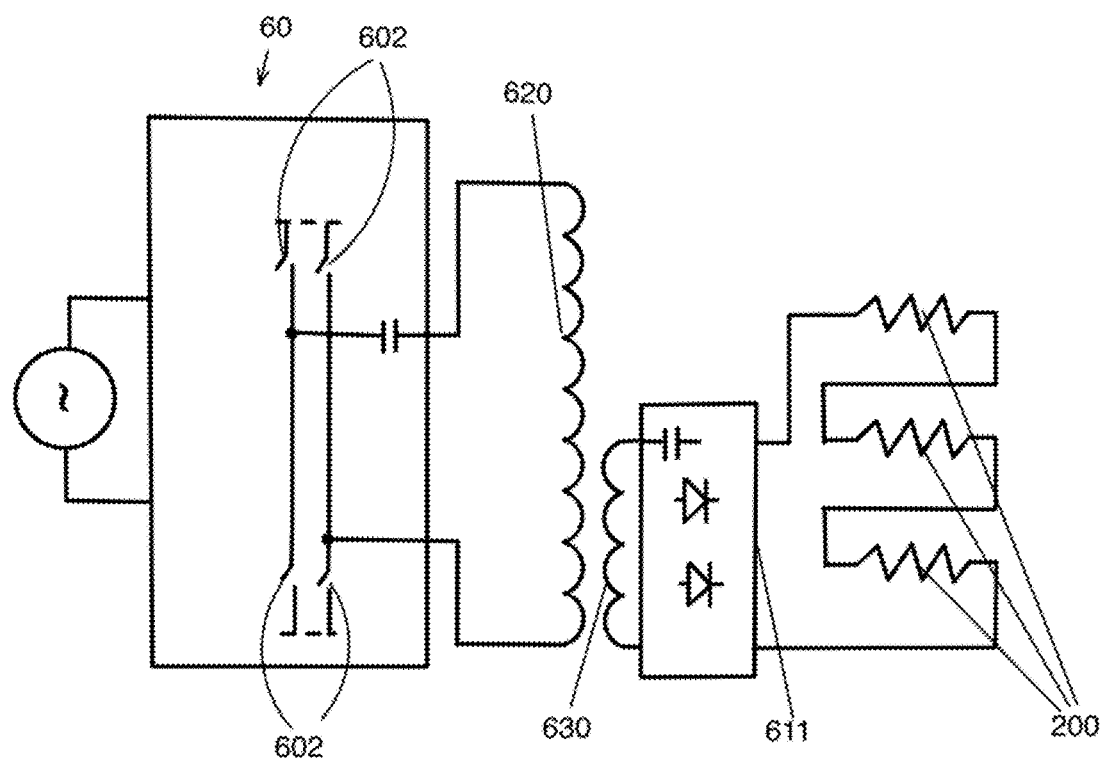
FIG. 6 is a block diagram of the heating elements power supply circuit.

As shown in FIG. 6, in the appliance control unit 60 it is generated the oscillating voltage by switching elements 602 that supply the transmission coil 620 of the power transmitter unit 62 coupled to the reception coil 630 of the power receiver unit 63. The voltage induced in the coil 630 is rectified and conditioned in the coil interface block 611 and brought with wires to the three heating elements 200 connected in series. The few components of the interface block 611 could be integrated in the power receiver unit 63.

Figure 8:
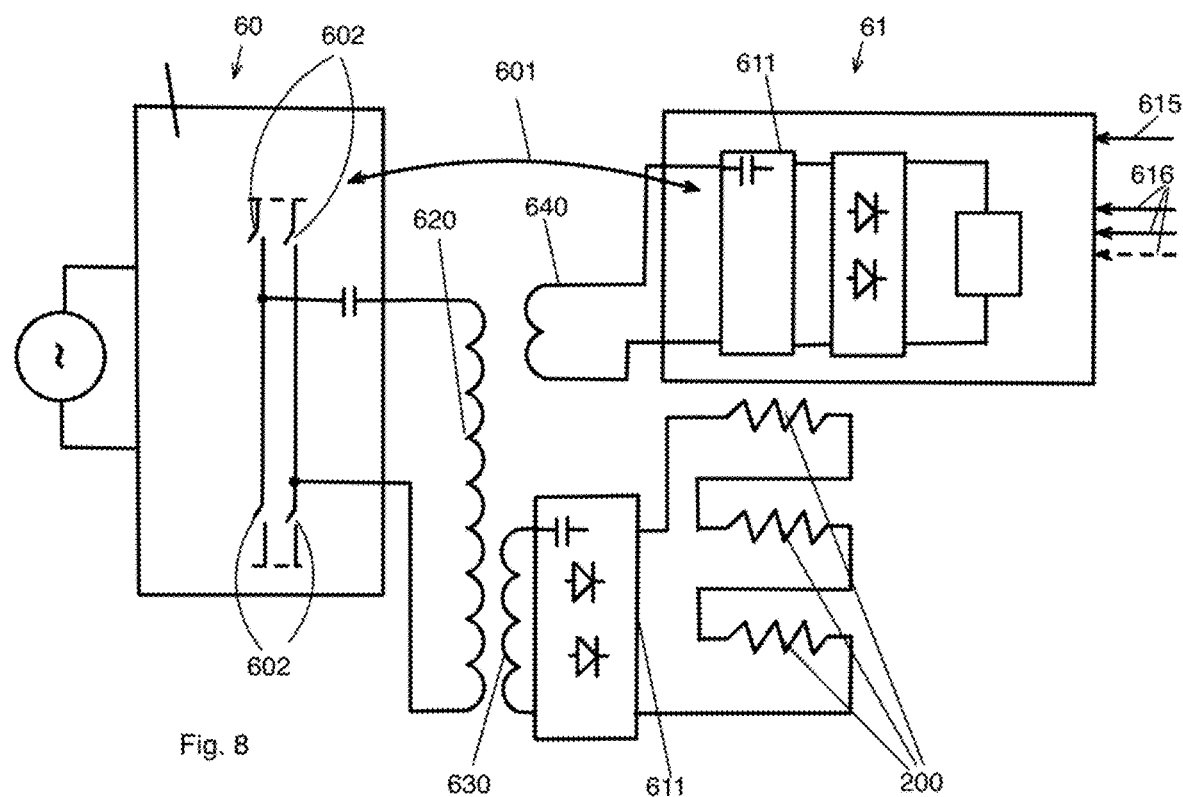
FIG. 8 is block diagram of another embodiment including an interface unit.

The appliance control unit 60 manages the complete washer (10) operation, controlling the drum motor rotation speed as well as the other appliance 10 actuators e.g. the drain pump (not shown in FIG. 8). The appliance control units 60 can measure the water temperature in the Tub 30 and generate the proper voltage supplying the heating elements through its switching element 602.

Figure 7:
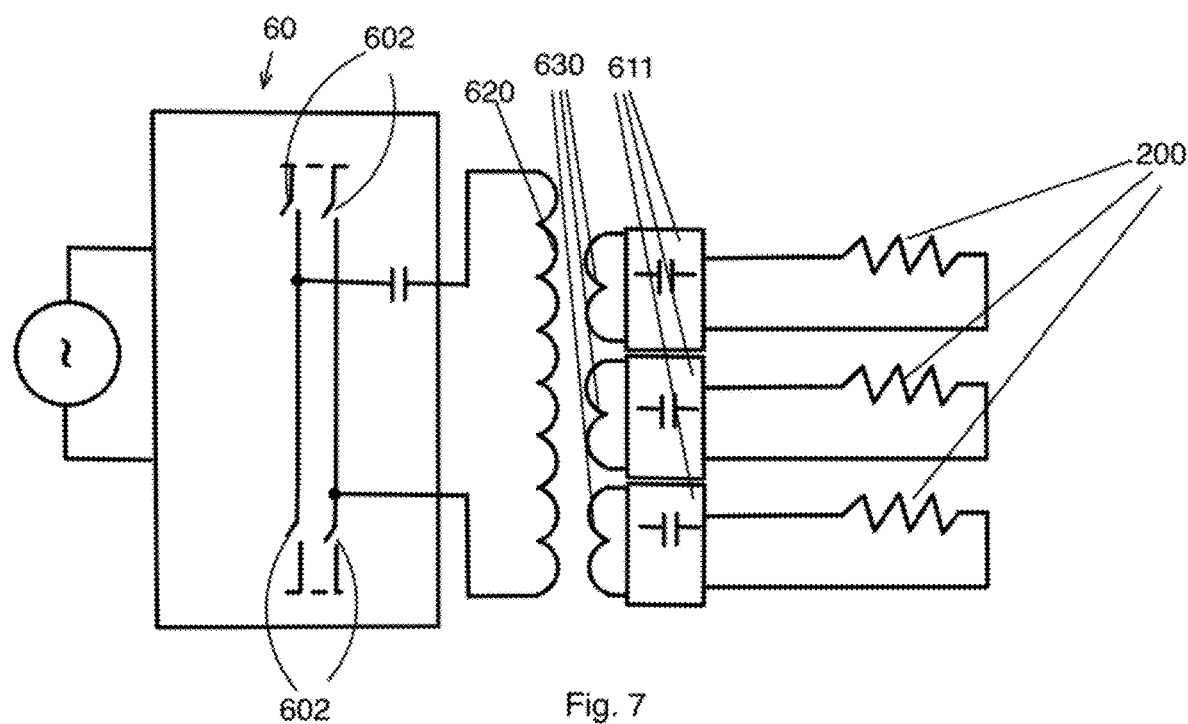
FIG. 7 is block diagram of another embodiment of the heating elements power supply circuit.

Another embodiment is shown in FIG. 7 where the power receiver unit 63 has multiple coils 630, each coil 630 supplying through its own interface block 611 a heating element 200.

One further advantageous embodiment is shown in FIG. 8. In this embodiment on the drum 50 there is fixed an interface unit. 61, together with the power receiver unit 63 and the heating element 200. The interface unit 61 can be supplied by a dedicated reception coil 640 of the receiver unit 63, as shown in FIG. 8, or it could be connected in parallel to the reception coil 630 supplying the heating elements 200.

The interface unit 61 has a wireless connection 601 to transfer measurement data to the appliance control unit 60.

In particular the interface unit 61 could transfer to the appliance control unit 60 measured temperatures 615 from temperature measurement elements positioned in the lifters 500. It would allow to design washing cycles based on the real temperature measured in the drum 50, not extrapolated by the temperature measured in the Tub 30 that at the beginning of the cycle can be very different. Moreover it would allow heating the clothes during the spinning implementing a simple long drying cycle.

The interface unit 61 could be positioned integrated in the isolating support material 632 of the power receiver unit 63. Or it could be positioned on the drum 50 external side at the centre, between the drum and the cross-piece.

Figure 9:
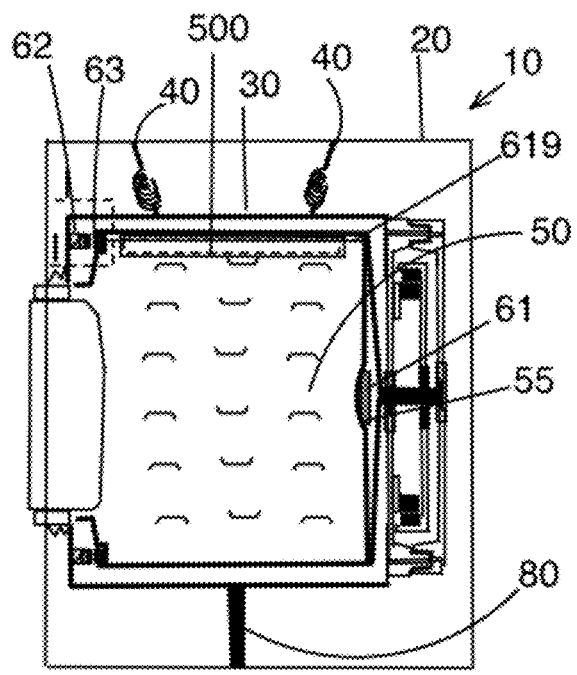
FIG. 9 is same sectional view of FIG. 1 showing the position of the interface unit in the drum centre.

The sectional view of FIG. 9 shows the interface unit 61 positioned on the drum 50 external side in the central area (55). The biggest advantage of this position 55 is that the interface unit 61 components are not subject to the high centrifugal forces.

Moreover by positioning the interface unit 61 in the drum 50 centre external side 55, it could sense and send additional measurement parameters, not only temperatures 615, but also e.g. water level, unbalance, providing all needed sensing information 616 to the appliance control unit 60. In this case, the appliance control unit 60 could be designed only to drive actuators like drain pump, inlet valve, drum motor and the power transmitter unit 62.

Advantageously, the wireless power receiver unit can supply power to any type of electric element mounted on the drum or fixed to the drum, including heating elements, signal transmission and/or reception elements (like wireless data transmission and/or reception devices) and sensor elements (like temperature sensors, water level sensors, humidity sensors, movement sensors such as speed or acceleration sensors).

The invention claimed is:

1. A laundry treating apparatus comprising:
a tub;
a drum rotatably mounted inside the tub to rotate about a rotation axis;
at least one electric element mounted in the drum;
a wireless power transmitter unit connected to the tub; and
a wireless power receiver unit connected to the drum;
wherein:
the wireless power receiver unit is configured to receive power from the wireless power transmitter unit, and supply the power to the at least one electric element;
the wireless power transmitter unit is annular shaped and centered on the rotation axis;
the wireless power receiver unit is annular shaped and centered on the rotation axis; and
the wireless power transmitter unit and the wireless power receiver unit are positioned one opposite to the other and parallel in a radial direction.

2. The laundry treating apparatus according to claim 1, wherein the at least one electric element comprises at least one heating element.

3. The laundry treating apparatus according to claim 1, wherein the at least one electric element comprises at least one interface unit configured to wirelessly transmit data.

4. The laundry treating apparatus according to claim 1, wherein the electric element comprises at least one sensor element.

5. The laundry treating apparatus according to claim 3, wherein the laundry treating apparatus comprises an appliance control unit and the electric element further comprises at least one sensor element fixed to the drum and configured to generate measurement data, wherein the at least one interface unit is configured to wirelessly transmit the measurement data to the control unit.

6. The laundry treating apparatus according to claim 1, wherein the power transmitter unit comprises a transmission coil generating a magnetic field and the power receiver unit comprises a reception coil generating power from the magnetic field generated by the transmission coil and supplying the generated power to the at least one electric element.

7. The laundry treating apparatus according to claim 6, wherein the transmission coil and the reception coil are aligned, centered and parallel in a radial direction.

8. The laundry treating apparatus according to claim 7, wherein the transmission coil and the reception coil have a common radius dimension approximately equal to the drum external radius and are distanced in an axial direction by a distance lower than their radius.

9. The laundry treating apparatus (10) according to claim 8, wherein the transmission coil and the reception coil are distanced in the axial direction by a distance lower than 10 cm.

10. The laundry treating apparatus according to claim 8, wherein the transmission coil and the reception coil are distanced in the axial direction by a distance lower than 5 cm.

11. The laundry treating apparatus according to claim 1, wherein the power receiver unit comprises a reception coil and a receiver magnetic shielding member, and the transmitter unit comprises a transmission coil and a transmission magnetic shielding member.

12. The laundry treating apparatus according to claim 11, wherein the receiver magnetic shielding member is positioned between the reception coil and the drum side, and the transmission magnetic shielding member is positioned between the transmission coil and the tub side.

13. The laundry treating apparatus according to claim 6, wherein:
the power receiver unit comprises a receiver shielding member positioned on the opposite side of the reception coil with respect to the power transmitter unit; and/or
the power transmitter unit comprises a transmission shielding member positioned on the opposite side of the transmission coil with respect to the power receiver unit.

14. The laundry treating apparatus according to claim 1, wherein the power receiver unit comprises at least two reception coils and the at least one electric element comprises at least two electric elements, the at least two reception coils supplying the at least two electric elements.

15. The laundry treating apparatus according to claim 1, wherein the drum comprises at least one drum lifter and the at least one electric element is integrated in the at least one drum lifter.

16. The laundry treating apparatus according to claim 4, wherein the drum comprises at least one drum lifter and the at least one sensor element comprises at least one temperature sensing element positioned in the at least one drum lifter and configured to generate temperature measurement data.

17. The laundry treating apparatus according to claim 16, wherein the apparatus comprises an appliance control unit and the at least one electric element comprises at least one interface unit designed to wirelessly transmit the temperature measurement data to the control unit.

18. The laundry treating apparatus according to claim 17, wherein the power receiver unit comprises a reception coil supplying the at least one interface unit and the at least one interface unit is fixed to the drum.

19. The laundry treating apparatus according to claim 17, wherein the interface unit is fixed to a central radial portion of the drum.

20. The laundry treating apparatus according to claim 17, wherein the interface unit is configured to wirelessly transmit to the control unit additional measurement data received from at least another sensor element.

* * * * *